US012682464B2

(12) United States Patent
Ito

(10) Patent No.: US 12,682,464 B2
(45) Date of Patent: Jul. 14, 2026

(54) IMAGE PROCESSING SYSTEM AND IMAGE PROCESSING METHOD

(71) Applicant: CANON KABUSHIKI KAISHA, Tokyo (JP)

(72) Inventor: Hidenori Ito, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 127 days.

(21) Appl. No.: 18/740,561

(22) Filed: Jun. 12, 2024

(65) Prior Publication Data

US 2025/0005766 A1 Jan. 2, 2025

(30) Foreign Application Priority Data

Jun. 30, 2023 (JP) ................................ 2023-107741

(51) Int. Cl.
*G06T 17/00* (2006.01)
*G06T 7/174* (2017.01)
(Continued)

(52) U.S. Cl.
CPC .............. *G06T 7/194* (2017.01); *G06T 7/174* (2017.01); *G06T 7/90* (2017.01); *G06T 17/00* (2013.01);
(Continued)

(58) Field of Classification Search
CPC ........... G06T 7/194; G06T 7/174; G06T 7/90; G06T 17/00; G06T 2207/20081;
(Continued)

(56) References Cited

U.S. PATENT DOCUMENTS 11,776,213 B2 10/2023 Ito
11,869,196 B2 1/2024 Ito
(Continued)

FOREIGN PATENT DOCUMENTS

JP 2021-056960 A 4/2021

OTHER PUBLICATIONS

Notice of Reasons for Refusal issued by the Japanese Patent Office on Dec. 3, 2024 in corresponding JP Patent Application No. 2023-107741, with English translation.
(Continued)

*Primary Examiner* — Hau H Nguyen
(74) *Attorney, Agent, or Firm* — Carter, DeLuca & Farrell LLP

(57) ABSTRACT

Implementation cost of image processing apparatuses is reduced and silhouette images with which highly accurate three-dimensional shape data can be generated are generated. An image processing system according to the present disclosure includes: a first image processing apparatus configured to generate data of a first silhouette image illustrating a region in which an object exists in a first input image of a region including at least part of a specific region by inputting data of the first input image into a learned model; and a second image processing apparatus configured to output data of a second silhouette image illustrating a region in which the object exists in a second input image by calculating a difference between the second input image and a background image obtained through image capturing by a second image capturing device in a state in which the object does not exist.

12 Claims, 9 Drawing Sheets

(51) Int. Cl.
*G06T 7/194* (2017.01)
*G06T 7/90* (2017.01)

(52) U.S. Cl.
CPC ............... *G06T 2207/20084* (2013.01); *G06T 2207/30196* (2013.01); *G06T 2207/30228* (2013.01)

(58) Field of Classification Search
CPC . G06T 2207/20084; G06T 2207/30196; G06T 7/254; G06T 7/292; G06T 7/136
See application file for complete search history.

(56) References Cited

U.S. PATENT DOCUMENTS

| | | | | |
|---|---|---|---|---|
| 2019/0043403 | A1* | 2/2019 | Van Droogenbroeck | G09G 3/20 |
| 2020/0250833 | A1* | 8/2020 | Takagi | G06T 7/215 |
| 2021/0104050 | A1 | 4/2021 | Ito | |
| 2021/0366129 | A1* | 11/2021 | Yamauchi | G06T 7/136 |
| 2022/0012932 | A1* | 1/2022 | Morisawa | G06V 10/22 |
| 2022/0044477 | A1* | 2/2022 | Takama | G06T 17/20 |

OTHER PUBLICATIONS

Notice of Reasons for Refusal issued by the Japanese Patent Office on Sep. 17, 2024 in corresponding JP Patent Application No. 2023-107741, with English translation.
Notice of Reasons for Refusal issued by the Japanese Patent Office on Dec. 16, 2025 in corresponding JP Patent Application No. 2025-032990, with English translation.

* cited by examiner

| IMAGE CAPTURING TARGET | CAUSES OF NON-DETECTION BY BACKGROUND DIFFERENCE METHOD | CAUSES OF FALSE DETECTION BY BACKGROUND DIFFERENCE METHOD |
|---|---|---|
| BASKETBALL | · NEAR STANDS AND BENCHES<br>· PAINTED AREA AND UNIFORM COLORS | · REFLECTION AT ARENA SURFACE<br>· UNIFORM SHADOW |
| BASEBALL | · LINE DISORDER OF EN-TOUT-CAS PART<br>· COLOR OF EN-TOUT-CAS PART<br>· DIGITAL SIGNAGE OF STADIUM | · SHADOW DUE TO ILLUMINATION IN PARTICULAR DIRECTION |
| RUGBY | · UNIFORM AND LINE COLORS<br>· SIGNAGE OUTSIDE FIELD | · SHADOW AT OVERCROWDING SUCH AS SCRUM |
| STUDIO PHOTOGRAPHING | · REFLECTION OF FLOOR COLOR ON UNCOLORED CLOTH | · SHADOW OF LARGE SUBJECT |

FIG.9

IMAGE PROCESSING SYSTEM AND IMAGE PROCESSING METHOD

BACKGROUND

Field

The present disclosure relates to technologies of generating a silhouette image illustrating a foreground region in an image.

Description of the Related Art

There are technologies of generating three-dimensional shape data representing the three-dimensional shape of an object of interest (hereinafter simply referred to as "object") by using data of a plurality of images (hereinafter referred to as "captured images") obtained through synchronized image capturing by image capturing apparatuses. The three-dimensional shape data is generated by a method such as a Visual Hull by using a silhouette image generated by extracting a region (hereinafter referred to as an "object region") corresponding to the object from each captured image. Examples of methods for generating a silhouette image from a captured image include a background difference method and a machine learning method. In the background difference method, a captured image obtained through image capturing in a duration in which no object exists in the angle of view of image capturing by an image capturing apparatus is set as a background image, and the difference between the background image and a captured image obtained through image capturing in a duration in which an object exists is calculated. Further, an object region and a background region in the captured image are separated based on the difference to generate a silhouette image (hereinafter referred to as a "silhouette image of the object") illustrating the object region. In the machine learning method, first, a sufficient number of pieces of learning data in which a captured image obtained through image capturing in a duration in which an object exists is paired with data that is supervised data and represents an object region in the captured image are prepared. Subsequently, a learned model is generated as a result of subjecting a learning model to learning by using the learning data. Further, the learned model is used to separate an object region and a background region in a captured image, thereby generating a silhouette image of an object.

A preferable separation method of separating an object region and a background region in a captured image is different in accordance with characteristics included in the angle of view of an image capturing apparatus. In a case where the background difference method is used as the separation method, an object region is not detected in regions as described below (hereinafter referred to as "non-detection of an object") from a captured image in some cases. Examples of such regions include a region in which an object that does not much move exists, a region in which a fixed background in a color similar to the color of an object exists, and a region that moves and at part of which a background in a color similar to the color of an object exists. Furthermore, in regions as described below, a region other than an object region is wrongly detected as a foreground region from a captured image (hereinafter referred to as "false detection of an object") in some cases. Examples of such regions include a region in which a shadow of an object occurs and a region in which a virtual image occurs due to reflection of an image of an object at a glossy floor, a wet field surface, or the like.

Non-detection or false detection of an object leads to missing or unremoved three-dimensional shape data. Thus, it is useful to perform separation processing by the machine learning method for a region in which non-detection or false detection potentially occurs in separation processing by the background difference method. However, in separation processing by the machine learning method, calculation cost is typically higher than in separation processing by the background difference method. Furthermore, in separation processing by the machine learning method, the shape of an object is inferred from statistics information of surrounding pixels, and accordingly, the accuracy of the boundary of an object region in a silhouette image degrades as compared to separation processing by the background difference method. Japanese Patent Laid-Open No. 2021-56960 discloses a technology of assigning, in the angle of view of one image capturing apparatus, a region in which separation processing by the background difference method is performed and a region in which separation processing by the machine learning method is performed.

However, with the technology disclosed in Japanese Patent Laid-Open No. 2021-56960, an image processing apparatus corresponding to one image capturing apparatus needs to have a configuration for performing both separation processing by the background difference method and separation processing by the machine learning method, which increases implementation cost of one image processing apparatus.

SUMMARY

An image processing system according to the present disclosure includes: a first image processing apparatus configured to generate data of a first silhouette image illustrating a region in which an object exists in a first input image by inputting data of the first input image to a learned model, the data of the first input image being data of an image obtained through image capturing of the object by a first image capturing device configured to capture an image of a region including at least part of a specific region; and a second image processing apparatus configured to generate data of a second silhouette image illustrating a region in which the object exists in a second input image by calculating a difference between the second input image and a background image that is an image obtained through image capturing by a second image capturing device different from the first image capturing device in a state in which the object does not exist in a region subjected to image capturing by the second image capturing device, as the data of the second input image being data of an image obtained through image capturing of the object by the second image capturing device.

Further features of various embodiments will become apparent from the following description of exemplary embodiments with reference to the attached drawings.

BRIEF DESCRIPTION OF THE DRAWINGS

FIG. 9 is a diagram illustrating an application example of the image processing system to other image capturing targets.

DESCRIPTION OF THE EMBODIMENTS

Figure 1:
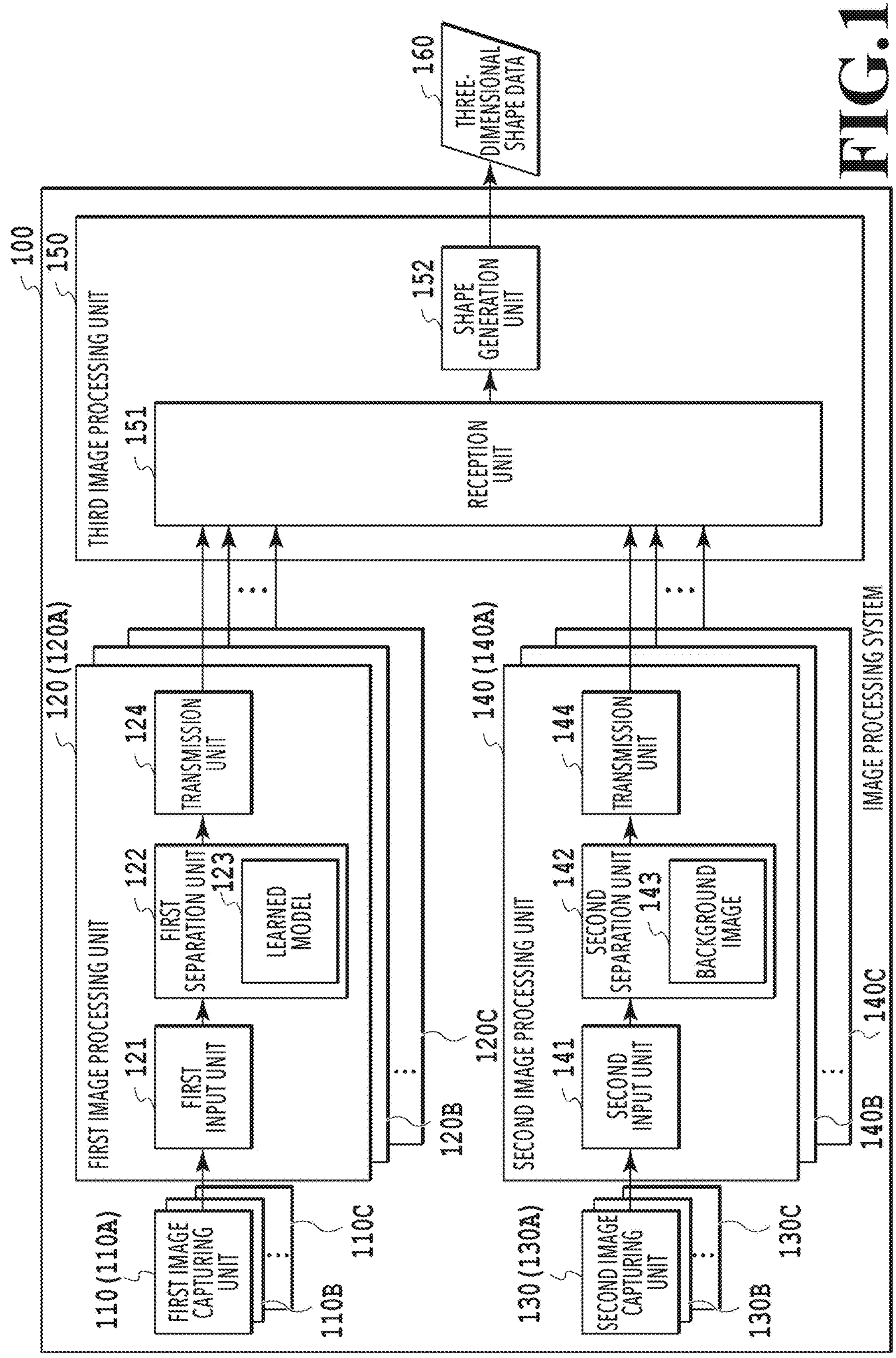
FIG. 1 is a block diagram illustrating an example of a functional configuration of an image processing system.

Hereinafter, with reference to the attached drawings, the present disclosure explains some example embodiments in detail. Configurations shown in the following embodiments are merely exemplary and some embodiments of the present disclosure are not limited to the configurations shown schematically. Identical components are denoted by the same reference sign in description. Terms with different alphabets provided after the same number in reference signs mean apparatuses that have the same function but are different from each other. For example, a first image capturing unit 110A and a first image capturing unit 110B illustrated in FIG. 1 are apparatuses that have the same function but are different from each other. Note that having the same function means having at least a particular function such as an image capturing function, and for example, some functions and capabilities of the first image capturing unit 110A and the first image capturing unit 110B may be different from each other.

Embodiment 1

The present embodiment will be described below for a case in which a region where a foreground region potentially cannot be detected in processing of separating a region (foreground region) corresponding to an object and a background region in an image by a background difference method exists in the angle of view of an image capturing apparatus.

[System Configuration]

FIG. 1 is a block diagram illustrating an example of a functional configuration of an image processing system 100 according to Embodiment 1. The image processing system 100 generates three-dimensional shape data (hereinafter referred to as "three-dimensional shape data of an object") 160 representing the three-dimensional shape of an object. A first image capturing unit 110 captures an image of an image capturing target, obtains data of a captured image obtained through the image capturing, and outputs the obtained data of the captured image to a first image processing unit 120. The first image processing unit 120 receives the data of the captured image output from the first image capturing unit 110 and generates a silhouette image of an object as a three-dimensional shape data generation target by separating a region (object region) corresponding to the object and the background region in the captured image. Data of the silhouette image generated by the first image processing unit 120 is transmitted to a third image processing unit 150.

The first image processing unit 120 includes a first input unit 121, a first separation unit 122, and a transmission unit 124. The first input unit 121 receives the data of the captured image output from the first image capturing unit 110 and stores the received data of the captured image in a storage apparatus provided inside the first image processing unit 120. The first separation unit 122 generates the silhouette image of the object by separating the foreground region as the object region and the background region included in the captured image. Specifically, the first separation unit 122 performs separation processing by a machine learning method, thereby separating the object region to generate the silhouette image. More specifically, the first separation unit 122 holds a learned model 123 inside. The learned model 123 is a model subjected to learning so that the model outputs data of a silhouette image of an object for inputting of data of a captured image including an object region. The learned model 123 generates the silhouette image by executing, for example, a semantic segmentation task that performs class identification for each pixel of an input image to separate the foreground region and the background region in the captured image.

Various kinds of methods using a convolutional neural network (CNN) are available as a method of achieving the learned model 123, and a plurality of network structures including an encoder layer, a decoder layer, and a skip structure are available. The learned model 123 is achieved by using, for example, a structure called SegNet or Unet. The data of the generated silhouette image and data of a texture image holding color information of the object region in the silhouette image are output to the transmission unit 124. The transmission unit 124 receives the data of the silhouette image and the texture image output from the first separation unit 122 and transmits the data to the third image processing unit 150. The transmission is performed through a communication interface (I/F) of a local area network (LAN), a wide area network (WAN), or the like.

A second image capturing unit 130 captures an image of an image capturing target, obtains data of the captured image obtained through the image capturing, and outputs the obtained data of the captured image to a second image processing unit 140. The second image processing unit 140 receives the data of the captured image output from the second image capturing unit 130 and generates a silhouette image of an object as a three-dimensional shape data generation target by separating a region (object region) corresponding to the object and the background region in the captured image. Data of the silhouette image generated by the second image capturing unit 130 is transmitted to the third image processing unit 150.

The second image capturing unit 130 includes a second input unit 141, a second separation unit 142, and a transmission unit 144. The second input unit 141 stores the received data of the captured image in a storage apparatus provided inside the second image processing unit 140. The second separation unit 142 generates the silhouette image of the object by separating the object region and the background region included in the captured image. Specifically, the second separation unit 142 performs separation processing by the background difference method, thereby separating the object region and the background region included in the captured image to generate the silhouette image of the object. More specifically, for example, the second separation unit 142 calculates the difference between a background image 143 that is a captured image obtained in a state in which the object as an image capturing target does not exist in the angle of view of the second image capturing unit 130 and a captured image obtained in a state in which the object exists. Then, the second separation unit 142 separates the object region and the background region in the captured image based on the calculated difference, thereby generating the silhouette image of the object.

The method of obtaining the background image 143 used in separation processing by the background difference method may be a method of obtaining, as the background image, a captured image at a moment when no object exists. Alternatively, the method may be a method of generating the background image by using a plurality of captured images obtained for a certain duration. Specifically, for example, pixel value change in the units of pixels or small regions of each captured image is observed and the background image is generated by using a pixel average value or the latest pixel value in the certain duration in a case where the pixel value change is equal to or smaller than a certain amount. The data of the silhouette image generated by the second separation unit 142 and data of a texture image holding color information of the object region in the silhouette image are output to the transmission unit 144. The transmission unit 144, which has the same function as the transmission unit 124, receives the data of the silhouette image and the texture image output from the second separation unit 142 and transmits the data to the third image processing unit 150.

The third image processing unit 150 generates three-dimensional shape data 160 of the object by using the data of the silhouette images and the texture images received from the first image processing unit 120 and the second image processing unit 140. The third image processing unit 150 includes a reception unit 151 and a shape generation unit 152. The reception unit 151 receives the data of the silhouette images and the texture images transmitted from the first image processing unit 120 and the second image processing unit 140 and stores the data in a storage apparatus provided inside the third image processing unit 150.

The shape generation unit 152 performs shape estimation processing and coloring processing for generating the three-dimensional shape data 160 by using the data of the silhouette images and the texture images received by the reception unit 151. Specifically, the shape generation unit 152 generates the three-dimensional shape data 160 by executing the shape estimation processing first and executing the coloring processing thereafter. For example, the Visual Hull can be used as the shape estimation processing. For example, first in the Visual Hull, a three-dimensional shape data generation target space is filled with rectangular parallelepipeds of a unit volume, which are called voxels. Hereinafter, an aggregation of voxels filling the three-dimensional shape data generation target space is referred to as a voxel group. Subsequently, each silhouette image generated by performing separation processing on an image captured by the first or second image capturing unit 110 or 130 is projected onto a voxel group for the image capturing range of the first or second image capturing unit 110 or 130. Subsequently, all silhouette images are used to remove, from the voxel group, voxels not included in a region in which the object region is projected in each silhouette image, thereby generating uncolored three-dimensional shape data. Subsequently in the coloring processing, the data of the texture image corresponding to each silhouette image is used as color information to apply texture to each voxel in the uncolored three-dimensional shape data generated by the shape estimation processing, and accordingly, the three-dimensional shape data is colored. Through such processing, the shape generation unit 152 generates the three-dimensional shape data 160.

Cases where the shape estimation processing fails will be described below. One of the cases is, for example, a state in which a region (object region) corresponding to an object is not included in a silhouette image of the object, that is, a case where non-detection of the object occurs. The other case is, for example, a case where a region other than a region corresponding to an object is included as the foreground region in a silhouette image of the object, that is, a case where false detection of the object occurs.

In a case where non-detection of an object occurs, any voxel corresponding to the object is wrongly removed from a voxel group. Thus, non-detection of an object should not occur in all captured images of the first and second image capturing units 110 and 130. In a case where false detection of an object occurs, three-dimensional shape data of a wrong shape different from the shape of the object is generated only in a case where image regions corresponding to the same voxel are falsely detected in all captured images of the first and second image capturing units 110 and 130. Thus, in false detection of the object, false detection only needs to be prevented in a captured image of at least one first or second image capturing unit 110 or 130 that captures an image of an image capturing target space corresponding to a space in which voxels constituting the wrong shape exist.

Note that the three-dimensional shape data 160 generated by the above-described processing is a three-dimensional point group as an aggregation of colored voxels, but the aspect of three-dimensional shape data is not limited thereto. For example, the three-dimensional shape data 160 may be three-dimensional shape data of a three-dimensional polygon mesh generated from a colored three-dimensional point group. In this case, for example, the shape generation unit 152 may include processing of generating data of the three-dimensional polygon mesh from the generated three-dimensional point group as three-dimensional shape data.

Figure 2:
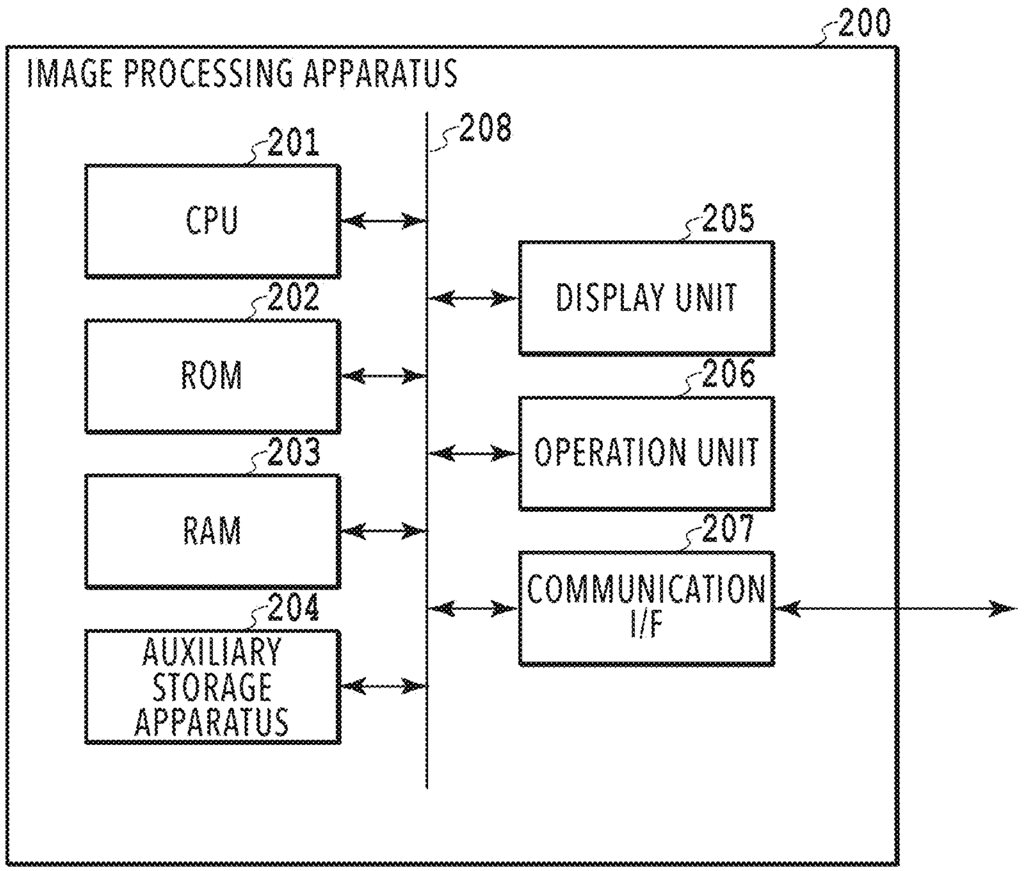
FIG. 2 is a block diagram illustrating an example of hardware configurations of a first image processing unit, a second image processing unit, and a third image processing unit.

FIG. 2 is a block diagram illustrating an example of hardware configurations of the first image processing unit 120, the second image processing unit 140, and the third image processing unit 150. The hardware configurations of the first image processing unit 120, the second image processing unit 140, and the third image processing unit 150 (hereinafter collectively referred to as an "image processing apparatus 200") are identical to one another. The image processing apparatus 200 includes a CPU 201, a ROM 202, a RAM 203, an auxiliary storage apparatus 204, a display unit 205, an operation unit 206, a communication I/F 207, and a bus 208.

The CPU 201 controls the entire image processing apparatus 200 by using computer programs and data stored in the ROM 202 or the RAM 203 and implements each component included as a functional component in the image processing apparatus 200. Note that the image processing apparatus 200 may include one or a plurality of dedicated hardware components different from the CPU 201, and at least part of processing by the CPU 201 may be executed by each dedicated hardware component. Examples of the dedicated hardware components include an application specific integrated circuit (ASIC), a field programmable gate array (FPGA), and a digital signal processor (DSP). The ROM 202 stores computer programs and the like that do not need to be changed. The RAM 203 is used as a work space of the CPU 201 and temporarily stores a computer program or data supplied from the auxiliary storage apparatus 204 and data or the like supplied from outside through the communication I/F 207. The auxiliary storage apparatus 204 is constituted by, for example, a large-capacity storage apparatus such as a hard disk drive and stores various kinds of data and the like. The RAM 203 and the auxiliary storage apparatus 204 hold input data, intermediate data being processed, and output data of the image processing apparatus 200.

The RAM 203 or the auxiliary storage apparatus 204 of the first image processing unit 120 holds data of a captured image received from the first image capturing unit 110, the learned model 123 used by the first separation unit 122, and intermediate data in separation processing using the learned model 123. The RAM 203 or the auxiliary storage apparatus 204 of the first image processing unit 120 also holds data of a silhouette image and a texture image generated by the first separation unit 122. The RAM 203 or the auxiliary storage apparatus 204 of the second image processing unit 140 holds data of a captured image received from the second image capturing unit 130, data of the background image 143 used by the second separation unit 142, and intermediate data for generating the background image 143. The RAM 203 or the auxiliary storage apparatus 204 of the second image processing unit 140 also holds data of a silhouette image and a texture image generated by the second separation unit 142. The RAM 203 or the auxiliary storage apparatus 204 of the third image processing unit 150 holds data of the silhouette images and the texture images received from the first image processing unit 120 and the second image processing unit 140. The RAM 203 or the auxiliary storage apparatus 204 of the third image processing unit 150 also holds intermediate data in the shape estimation processing by the shape generation unit 152 and uncolored three-dimensional shape data after the shape estimation processing.

The display unit 205 is constituted by a liquid crystal display, a light-emitting diode (LED), or the like and displays, for example, a graphical user interface (GUI) for a user to operate the image processing apparatus 200. The operation unit 206 is constituted by a keyboard, a mouse, a joystick, a touch panel, or the like, receives an operation by the user, and inputs various instructions to the CPU 201. The CPU 201 operates as a display control unit that controls the display unit 205, and an operation control unit that controls the operation unit 206. The communication I/F 207 is used for communication between the image processing apparatus 200 and an external apparatus.

The first image processing unit 120 includes, as the communication I/F 207, an I/F for receiving data of a captured image from the first image capturing unit 110 and an I/F for transmitting data of a silhouette image and a texture image to the third image processing unit 150. The second image processing unit 140 includes, as the communication I/F 207, an I/F for receiving data of a captured image from the second image capturing unit 130 and an I/F for transmitting data of a silhouette image and a texture image to the third image processing unit 150. The third image processing unit 150 includes, as the communication I/F 207, an I/F for receiving data transmitted from the first image processing unit 120 and the second image processing unit 140. The communication I/F 207 is implemented by, for example, a wired network I/F for Ethernet or the like, a wireless network I/F for a wireless LAN or the like, or a serial digital interface (SDI) that transmits and receives image signals. The bus 208 connects components included as hardware components in the image processing apparatus 200 and transfers information. In the present embodiment, the display unit 205 and the operation unit 206 exist inside the image processing apparatus 200, but at least one of the display unit 205 and the operation unit 206 may exist as a separate apparatus outside the image processing apparatus 200.

System Application Example

Figure 3:
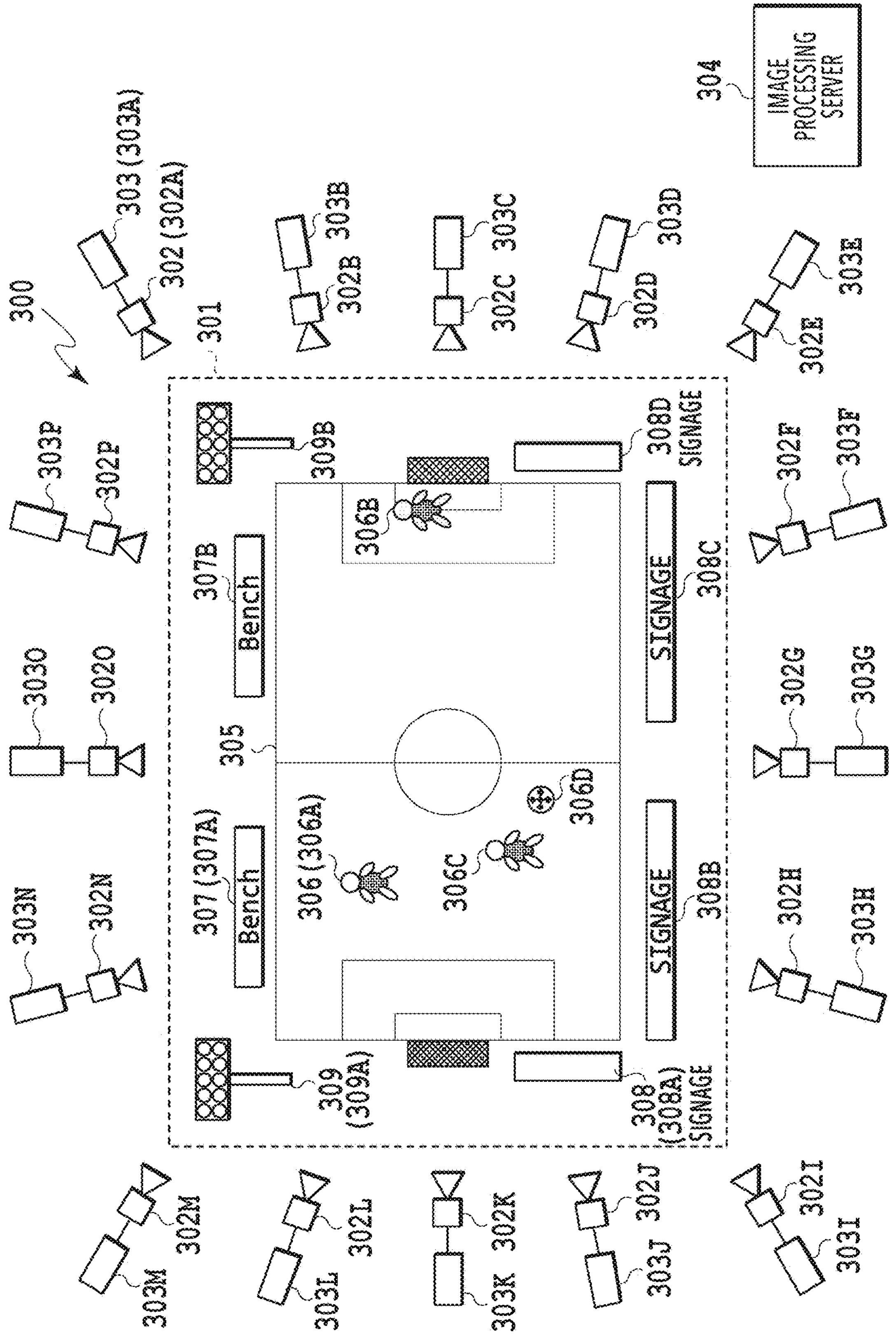
FIG. 3 is a diagram illustrating an application example of the image processing system.

FIG. 3 is a diagram illustrating an application example 300 of the image processing system 100 according to Embodiment 1. The application example 300 illustrated in FIG. 3 corresponds to an example in which the image processing system 100 is applied to a soccer stadium as an image capturing target. A playing field 305 and an object 306 as a three-dimensional shape data generation target exist in an image capturing target space 301. In a case of soccer, the object 306 includes objects 306A to 306C as players and an object 306D as a soccer ball. Among them, the objects 306A and 306C are field players and the object 306B is a goalkeeper. The object 306 may include a referee not illustrated in FIG. 3. In addition, benches 307 where players stand by and signages 308 painted on the floor surface of the soccer stadium or laid as a stereoscopic object in a signboard shape exist near the playing field 305. Furthermore, illumination apparatuses 309 that are turned on in a case where illuminance is insufficient in night, rainy weather, and the like exist around the playing field 305.

The signages 308 in a signboard shape include a digital signage that is displayed on a display and the display contents of which change as time elapses. The illumination apparatuses 309 may be light sources that are locally disposed and emit strong light so that a dark shadow of the object 306 occurs in a particular direction. Alternatively, the illumination apparatuses 309 may be light sources disposed at constant intervals around the playing field 305 so that a light shadow of the object 306 uniformly occurs around the object. A virtual image of the object 306 sometimes occurs on the floor surface of the playing field 305 due to specular reflection in a case where the field surface is wet with rain or the like. Note that processing by the image processing system 100 in a case where a shadow or a virtual image of the object 306 occurs will be described in Embodiment 2.

Image capturing apparatuses 302A to 302P that are each the first image capturing unit 110 or the second image capturing unit 130 are disposed around the image capturing target space 301. Each image capturing apparatus 302 captures an image of at least part of the image capturing target space 301. Although FIG. 3 illustrates an aspect in which the image capturing apparatuses 302 are disposed surrounding the image capturing target space 301 in a panoramic plan view of the image capturing target space 301, the image capturing apparatuses 302 are disposed also with variation in the elevation angles of the image capturing apparatuses 302 relative to the image capturing target space 301. With such disposition of the image capturing apparatuses 302, image capturing of the object 306 can be performed at various angles and high-quality three-dimensional shape data can be generated.

In a case where a shadow or a virtual image of the object 306 occurs, which will be described in Embodiment 2, each image capturing apparatus 302 is decided as the first image capturing unit 110 or the second image capturing unit 130 in accordance with the elevation angle of the image capturing apparatus 302. Each image capturing apparatus 302 outputs data of a captured image to an image capturing apparatus control box 303 as the first image processing unit 120 or the second image processing unit 140. The image capturing apparatus control box 303 receives data of the captured image and generates data of a silhouette image and a texture image of the object 306 in a case where a region (hereinafter referred to as a "region of the object 306") corresponding to the object 306 exists in the captured image. Then, the image capturing apparatus control box 303 transmits data of the generated silhouette image and the generated texture image to an image processing server 304 as the third image processing unit 150. The image processing server 304 generates three-dimensional shape data by using the data of the silhouette image and the texture image received from each image capturing apparatus control box 303.

Figure 4:
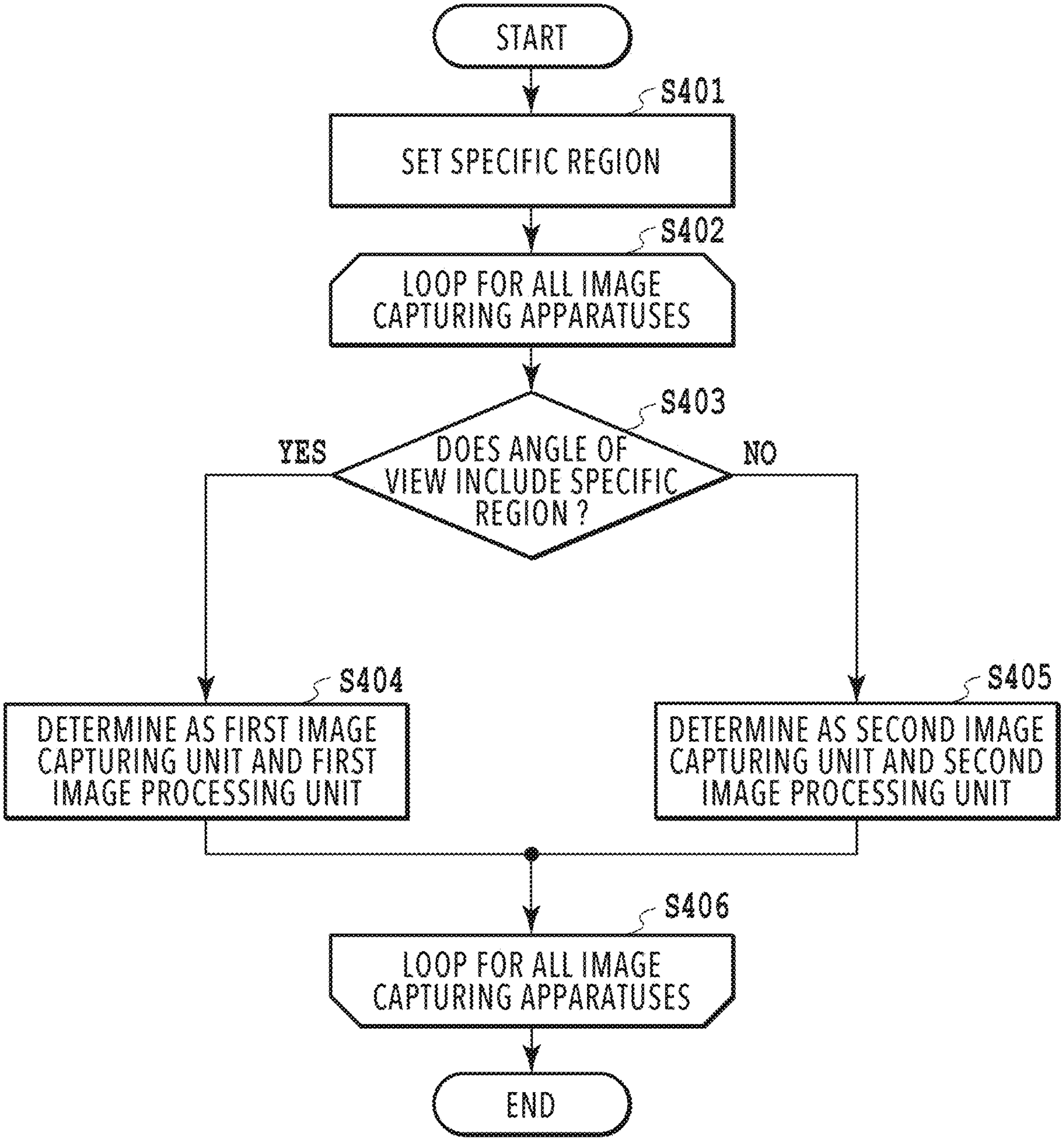
FIG. 4 is a flowchart illustrating an example of the process of deciding a first or second image capturing unit and the first or second image processing unit.

A method of deciding each image capturing apparatus 302 and the corresponding image capturing apparatus control box 303 as the first image capturing unit 110 and the first image processing unit 120 or as the second image capturing unit 130 and the second image processing unit 140 will be described below with reference to FIGS. 4 and 5A to 5F. FIG. 4 is a flowchart illustrating an example of the process of deciding the first or second image capturing unit 110 or 130 and the first or second image processing unit 120 or 140 according to Embodiment 1. The decision of the first or second image capturing unit 110 or 130 and the first or second image processing unit 120 or 140 is performed based on the angle of view of each image capturing apparatus 302, which is decided when the image capturing apparatus 302 is installed, before image capturing using the image processing system 100 is performed. Note that, in the following description, the first character "S" of a reference sign means step (process). At S401, a user sets a specific region. In Embodiment 1, the specific region is a region in which non-detection of the object 306 potentially occurs although the region of the object 306 exists in processing of separating the region of the object 306 by the background difference method performed at the second image processing unit 140.

Figure 5A:
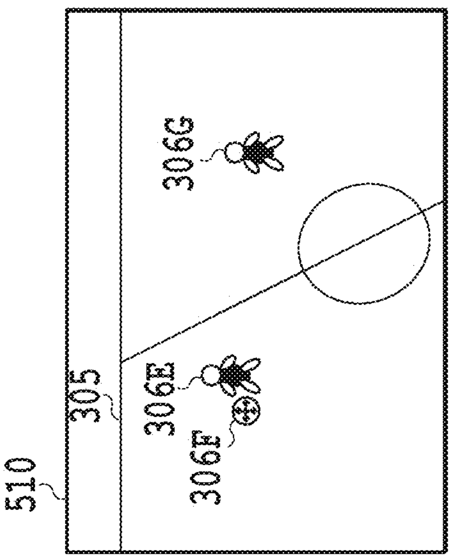
FIGS. 5A to 5F are diagrams illustrating an example of the angle of view of an image capturing apparatus.

The specific region will be described below with reference to FIGS. 5A to 5F. FIGS. 5A to 5F are diagrams illustrating an example of the angle of view of each image capturing apparatus 302 according to Embodiment 1. FIG. 5A illustrates an example of an angle of view 510 of an image capturing apparatus 302, which includes objects 306E and 306G as field players and an object 306F as a ball in the playing field 305. In the angle of view 510, all objects 306 move at a certain speed or faster, and accordingly, the same object 306 does not continuously exist at a pixel for a certain duration or longer. Thus, a background image in which no object 306 exists can be generated. Consider a case where, in the angle of view 510, a certain difference or larger exists between the color value of the object 306 and the pixel value of the background image. In this case, the background image can be produced and the difference between the pixel value of the region of the object 306 in an image captured in the angle of view 510 and the pixel value of a region corresponding to the region in the background image is equal to or larger than a certain value. Thus, the angle of view 510 of the image capturing apparatus 302 includes no specific region.

Figure 5B:
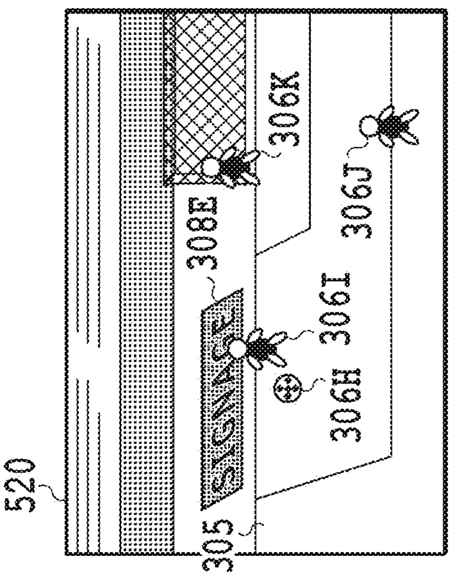
Figure 5C:
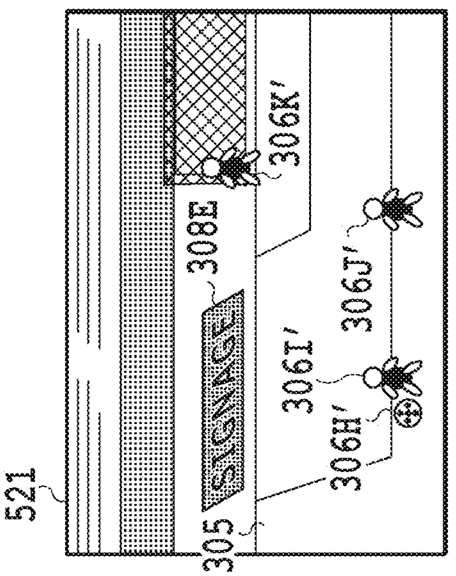

FIG. 5B illustrates an angle of view 520 of an image capturing apparatus 302, which includes objects 306I and 306J as field players, an object 306H as a ball, and an object 306K as a goalkeeper in the playing field 305. In addition, a signage 308E painted on the floor surface of the soccer stadium exists in the angle of view 520 of the image capturing apparatus 302. FIG. 5C illustrates an angle of view 521 identical to the angle of view 520 of the image capturing apparatus 302 illustrated in FIG. 5B after a certain time elapses since the state of the angle of view 520. The objects 306 and the signage 308 existing in the state of the angle of view 520 exist in the angle of view 521. Among them, any object 306 that has moved is denoted by its reference sign with "'" at the end in FIG. 5C. For example, the object 306I is the same field player as an object 306I', indicating that the field player is moving.

The specific region in the angle of view 520 (521) will be described below. The position of the object 306K as a goalkeeper hardly changes as the certain time elapses. A region corresponding to such an object 306 substantially at rest in a captured image is determined as a region constituting a background image by a background image generation method of determining, as the background region, any pixel the pixel value of which does not change for a certain time. Accordingly, the region of the object 306K is included in the background image. As a result, in a case where object region separation processing by the background difference method is performed, no difference occurs between the captured image and the background image in the region of the object 306K and non-detection of the object 306K occurs. Thus, no silhouette image of the object 306K is generated. The user sets, as the specific region, a region in which an object 306 that does not much move, in other words, is substantially at rest like the object 306K as a goalkeeper potentially exists.

The signage 308 painted on the floor surface of the soccer stadium does not move and thus is included in the background image. The following discusses a case where the difference value between the pixel value of a region corresponding to the signage 308 and the pixel value of the uniform of a player as an object 306 in a captured image is smaller than a predetermined threshold value. In other words, a case where the color of the signage 308 and the color of the uniform are similar colors is discussed. In such a case, since the difference value between the pixel values of the uniform of the player and the signage 308 is not equal to or larger than the predetermined threshold value, non-detection of the object 306 as the player occurs and a silhouette image illustrating a region corresponding to the player is not generated. The user sets, as the specific region, a background region in which a color similar to the color of an object 306 as a three-dimensional shape data generation target potentially exists at part of the background image.

Figure 5D:
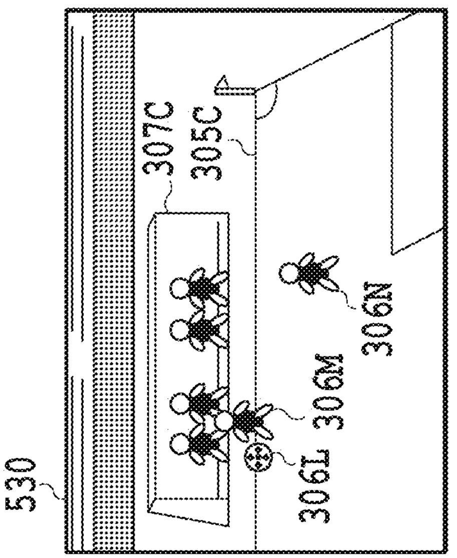

FIG. 5D illustrates an angle of view 530 of an image capturing apparatus 302, which includes objects 306M and 306N as field players and an object 306L as a ball in the playing field 305, and a bench 307C where backup players stand by. None of the bench 307C and the backup players existing therein is a three-dimensional shape data generation target. Since the backup players in the bench 307C are natural persons, the backup players move as time elapses. In a case where a background image is generated in the angle of view 530 of the image capturing apparatus 302, part of a region corresponding to a backup player in a captured image does not belong to a pixel that does not change for a certain time or longer and thus is not included in the background image. In a case where object region separation processing by the background difference method is performed on the captured image by using such a background image, part of the region corresponding to the backup player is separated as the foreground region and a silhouette image illustrating the foreground region is generated.

Part of a region corresponding to a backup player that does not move in a captured image belongs to a pixel that does not change for a certain time or longer and thus is included in the background image. In this case, a certain difference or larger does not occur between the pixel value of a region corresponding to the body or uniform of the backup player included in the background image and the pixel value of a region corresponding to the body or uniform of a field player as an object 306 in the captured image. Thus, object region separation cannot be correctly performed, which leads to non-detection at part of the object 306, and accordingly, a silhouette image from which part of the region corresponding to the object 306 lacks is generated. The user sets, as the specific region, the background region in which a stable background image cannot be generated and a color similar to the color of the object 306 potentially exists at part of the background image.

Figure 5E:
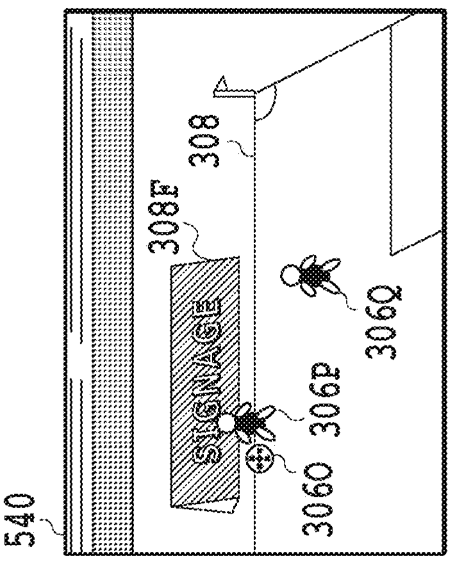
Figure 5F:
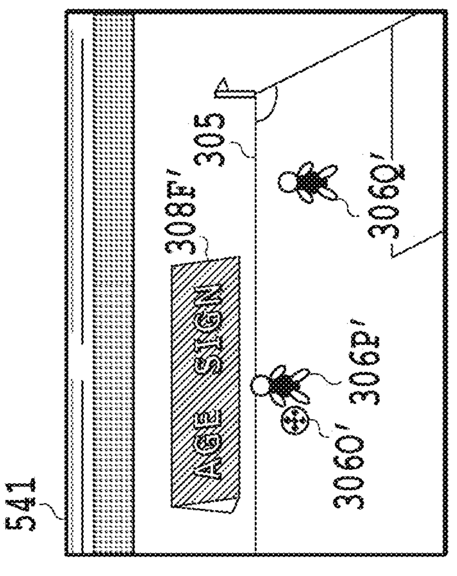

FIG. 5E illustrates an angle of view 540 of an image capturing apparatus 302, which includes objects 306P and 306Q as field players and an object 3060 as a ball in the playing field 305. In addition, a signage 308F as a digital signage having a signboard shape and installed outside the playing field 305 exists in the angle of view 540 of the image capturing apparatus 302. FIG. 5F illustrates an angle of view 541 identical to the angle of view 540 of the image capturing apparatus 302 illustrated in FIG. 5E after a certain time elapses. The objects 306 and the signage 308 that exist in the state of the angle of view 540 of the image capturing apparatus 302 exist in the angle of view 541. Among them, any object 306 or signage 308 that has moved is denoted by its reference sign with "'" at the end in FIG. 5F. For example, the signage 308F as a digital signage is denoted as a signage 308F' since its display contents change.

The specific region in the angle of view 540 (541) will be described below. Since the display contents of a digital signage as a signage 308 change, a pixel of a region corresponding to the signage 308 in a captured image is not a pixel the pixel value of which does not change for a certain time or longer, and the region is not included in the background image. Thus, in a case where object region separation processing by the background difference method is performed on a captured image in the state of the angle of view 540 and a captured image in the state of the angle of view 541, the region of the signage 308F is wrongly separated as the foreground region. As a result, a silhouette image of the signage 308F that is not a three-dimensional shape data generation target is generated.

In a case where the pixel value of a region corresponding to a signage 308 in a captured image does not change for a certain time or longer, the region is included in the background image. In this case, non-detection of an object 306 occurs in a case where the color of the object 306 is similar to a color used in the display contents of a digital signage included in the background image. As a result, a silhouette image of the object 306 is not generated. The user sets, as the specific region, such a region in which a silhouette image of an object that is not a three-dimensional shape data generation target is potentially generated and a region in which a stable background image cannot be generated and non-detection of an object 306 potentially occurs.

In summary, the specific region according to Embodiment 1 includes a region in which an object that does not much move potentially exists and a region in which a fixed background having a color similar to the color of an object potentially exists. The specific region according to Embodiment 1 also includes a region in which the background region that moves and has a color similar to the color of an object 306 at part of a background image potentially exists. Note that the specific region is not limited to those described above, and a region including a factor that causes non-detection of an object in object region separation processing by the background difference method may be set as the specific region. By setting such a specific region, the user can apply the present disclosure to cases other than the cases described above with reference to FIGS. 5A to 5F.

Description of the flowchart illustrated in FIG. 4 continues. After S401, the user decides whether each image capturing apparatus 302 is the first image capturing unit 110 or the second image capturing unit 130 and whether data of a captured image output from the image capturing apparatus 302 is to be processed at the first image processing unit 120 or the second image processing unit 140. Specifically, the user performs processes at S403 to S405 for each image capturing apparatus 302. Specifically, for example, in the case of the application example 300 illustrated in FIG. 3, the user performs the processes at S403 to S405 for each of the image capturing apparatuses 302A to 302P. Note that S402 indicates start of a loop of the processes at S403 to S405.

At S402, the user selects an optional image capturing apparatus 302 from among one or more image capturing apparatuses 302 not selected so far. Subsequently at S403, the user determines whether the angle of view of image capturing by the image capturing apparatus 302 selected at S402 includes the specific region. In a case where having determined that the specific region is included at S403, the user decides that the image capturing apparatus 302 selected at S402 is the first image capturing unit 110 and the image capturing apparatus control box 303 corresponding to the image capturing apparatus 302 is the first image processing unit 120 at S404. In a case where having determined that no specific region is included at S403, the user decides that the image capturing apparatus 302 selected at S402 is the second image capturing unit 130 and the image capturing apparatus control box 303 corresponding to the image capturing apparatus 302 is the second image processing unit 140 at S405.

S406 indicates end of the loop of the processes at S403 to S405. At S406, the user determines whether all image capturing apparatuses 302 are selected at S402. In a case where having determined that not all image capturing apparatuses 302 are selected, in other words, an image capturing apparatus 302 yet to be selected exists at S406, the user returns to S402 and selects an optional image capturing apparatus 302 not selected so far. Thereafter, the processes at S402 to S406 are repeatedly performed until it is determined at S406 that all image capturing apparatuses 302 are selected. In a case where having determined that all image capturing apparatuses 302 are selected at S406, the user ends the decision process illustrated in the flowchart of FIG. 4.

Specific examples of the method of deciding an image capturing apparatus 302 and an image capturing apparatus control box 303 will be described below with reference to the angles of view 510, 520, 530, and 540 illustrated in FIGS. 5A, 5B, 5D, and 5E. Since the angle of view 510 of an image capturing apparatus 302 includes no specific region, it is decided that the image capturing apparatus 302 is the second image capturing unit 130 and the image capturing apparatus control box 303 connected to the image capturing apparatus 302 is the second image processing unit 140. Since the angles of view 520, 530, and 540 of an image capturing apparatus 302 each include the specific region, it is decided that the image capturing apparatus 302 is the first image capturing unit 110 and the image capturing apparatus control box 303 connected to the image capturing apparatus 302 is the first image processing unit 120.

For example, the user first installs all image capturing apparatuses 302 at desired positions and aligns the angle of view of each image capturing apparatus 302 to a desired angle of view. Subsequently, the user installs the first image processing unit 120, for example, near an image capturing apparatus 302 decided as the first image capturing unit 110 based on decision through the decision process illustrated in the flowchart of FIG. 4 and connects the first image processing unit 120 to the first image capturing unit 110 and the third image processing unit 150. Similarly, the user installs the second image processing unit 140, for example, near an image capturing apparatus 302 decided as the second image capturing unit 130 and connects the second image processing unit 140 to the second image capturing unit 130 and the third image processing unit 150.

Figure 6A:
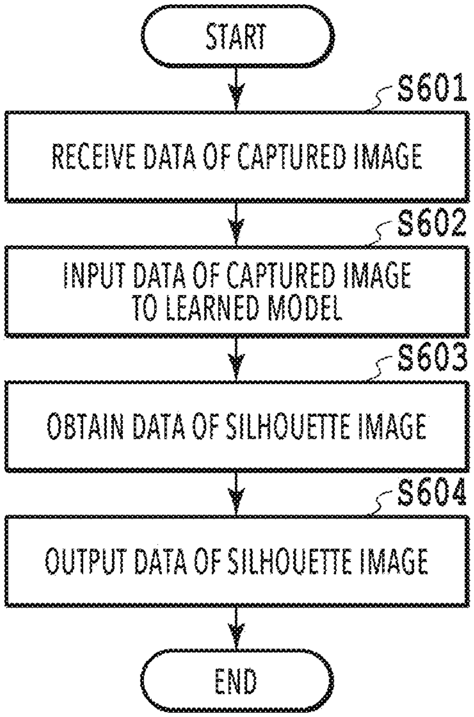
FIGS. 6A to 6C are flowcharts illustrating an example of processes of processing at the first image processing unit, the second image processing unit, and the third image processing unit.

Operation of the first image processing unit 120, the second image processing unit 140, and the third image processing unit 150 will be described below with reference to FIGS. 6A, 6B, and 6C. FIG. 6A is a flowchart illustrating an example of the process of processing at the first image processing unit 120 according to Embodiment 1. First at S601, the first input unit 121 receives data of a captured image output from the first image capturing unit 110. Subsequently at S602, the first separation unit 122 inputs data of the captured image received at S601 to the learned model 123. Subsequently at S603, the first separation unit 122 obtains data of a silhouette image generated by the learned model 123. Subsequently at S604, the transmission unit 124 outputs the data of the silhouette image obtained at S603 to the third image processing unit 150. After S604, the first image processing unit 120 ends the processing of the flowchart illustrated in FIG. 6A, and repeatedly executes the processing of the flowchart illustrated in FIG. 6A each time the first image capturing unit 110 outputs data of a new captured image.

Figure 6B:
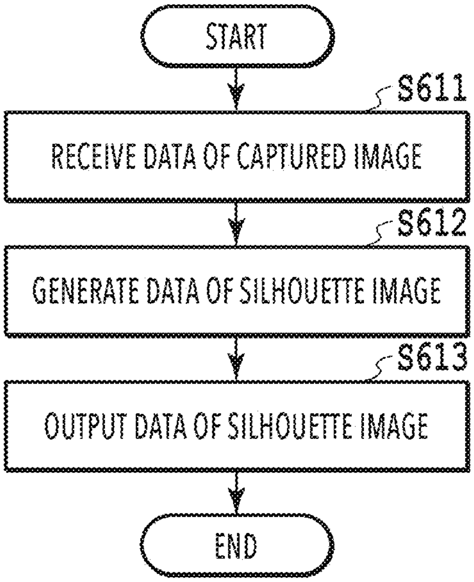

FIG. 6B is a flowchart illustrating an example of the process of processing at the second image processing unit 140 according to Embodiment 1. First at S611, the second input unit 141 receives data of a captured image output from the second image capturing unit 130. Subsequently at S612, the second separation unit 142 generates a silhouette image by performing separation processing by the background difference method on the data of the captured image received at S601 by using data of a background image. Subsequently at S613, the transmission unit 144 outputs data of the silhouette image generated at S612 to the third image processing unit 150. After S613, the second image processing unit 140 ends the processing of the flowchart illustrated in FIG. 6B, and repeatedly executes the processing of the flowchart illustrated in FIG. 6B each time the second image capturing unit 130 outputs data of a new captured image.

Figure 6C:
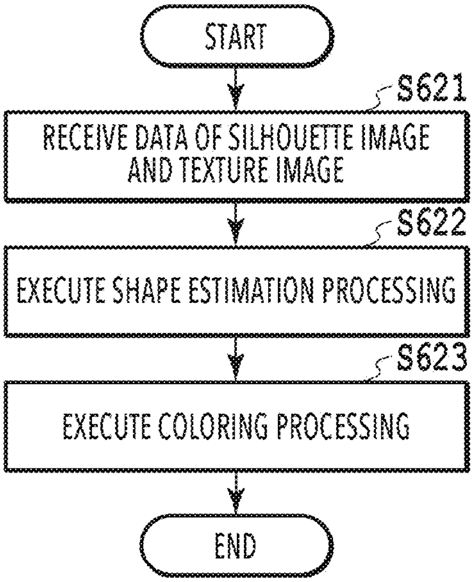

FIG. 6C is a flowchart illustrating an example of the process of processing at the third image processing unit 150 according to Embodiment 1. First at S621, the reception unit 151 receives data of silhouette images and texture images transmitted from the first image processing unit 120 and the second image processing unit 140. For example, the first image capturing unit 110 and the second image capturing unit 130 perform image capturing in synchronization with each other, and the reception unit 151 receives data of silhouette images and texture images based on data of captured images obtained through the image capturing at the same time point. Note that the same time point is not limited to precisely identical time points but includes substantially identical time points.

After S621, the shape generation unit 152 executes shape estimation processing of three-dimensional shape data by using the data of the silhouette images received at S621 at S622. Subsequently at S623, the shape generation unit 152 generates the three-dimensional shape data 160 by executing, with the data of the texture images, coloring processing on the three-dimensional shape data generated at S622. After S623, the third image processing unit 150 ends the processing of the flowchart illustrated in in FIG. 6C. Thereafter, the third image processing unit 150 repeatedly executes the processing of the flowchart illustrated in in FIG. 6C each time the first image processing unit 120 and the second image processing unit 140 output data of new silhouette images and texture images.

As described above, in the background difference method, the image processing system 100 is configured such that a region in which non-detection of an object potentially occurs is set as the specific region. The image processing system 100 is also configured such that data of a captured image output from an image capturing apparatus 302 having an angle of view including the specific region is input to at least an image processing apparatus that performs object region separation with the learned model 123. The image processing system 100 is further configured such that data of a captured image output from an image capturing apparatus 302 having an angle of view including no specific region is input to an image processing apparatus that performs object region separation by the background difference method. The image processing system 100 is further configured such that an image processing apparatus that appropriately performs object region separation is decided in accordance with the angle of view of an image capturing apparatus 302. According to the image processing system 100 configured as described above, it is not needed to provide, to one image processing apparatus, a configuration for performing both separation processing by the background difference method and separation processing by a machine learning method. Thus, it is possible to reduce implementation cost of image processing apparatuses and generate silhouette images with which highly accurate three-dimensional shape data can be generated.

Embodiment 2

The present embodiment will be described below for a case where a region in which a region other than the region of an object 306 is potentially wrongly detected as the foreground region in object region separation processing by the background difference method exists in the angle of view of an image capturing apparatus 302. Examples of regions that are potentially wrongly detected include a region in which a shadow of an object 306 potentially occurs and a region in which an image of an object 306 is reflected on the surface of the playing field 305 and a virtual image potentially occurs. An image processing system according to Embodiment 2 has the same functional configuration as the functional configuration of the image processing system 100 illustrated in FIG. 1, and thus any difference from Embodiment 1 will be described below.

System Application Example

Figure 7:
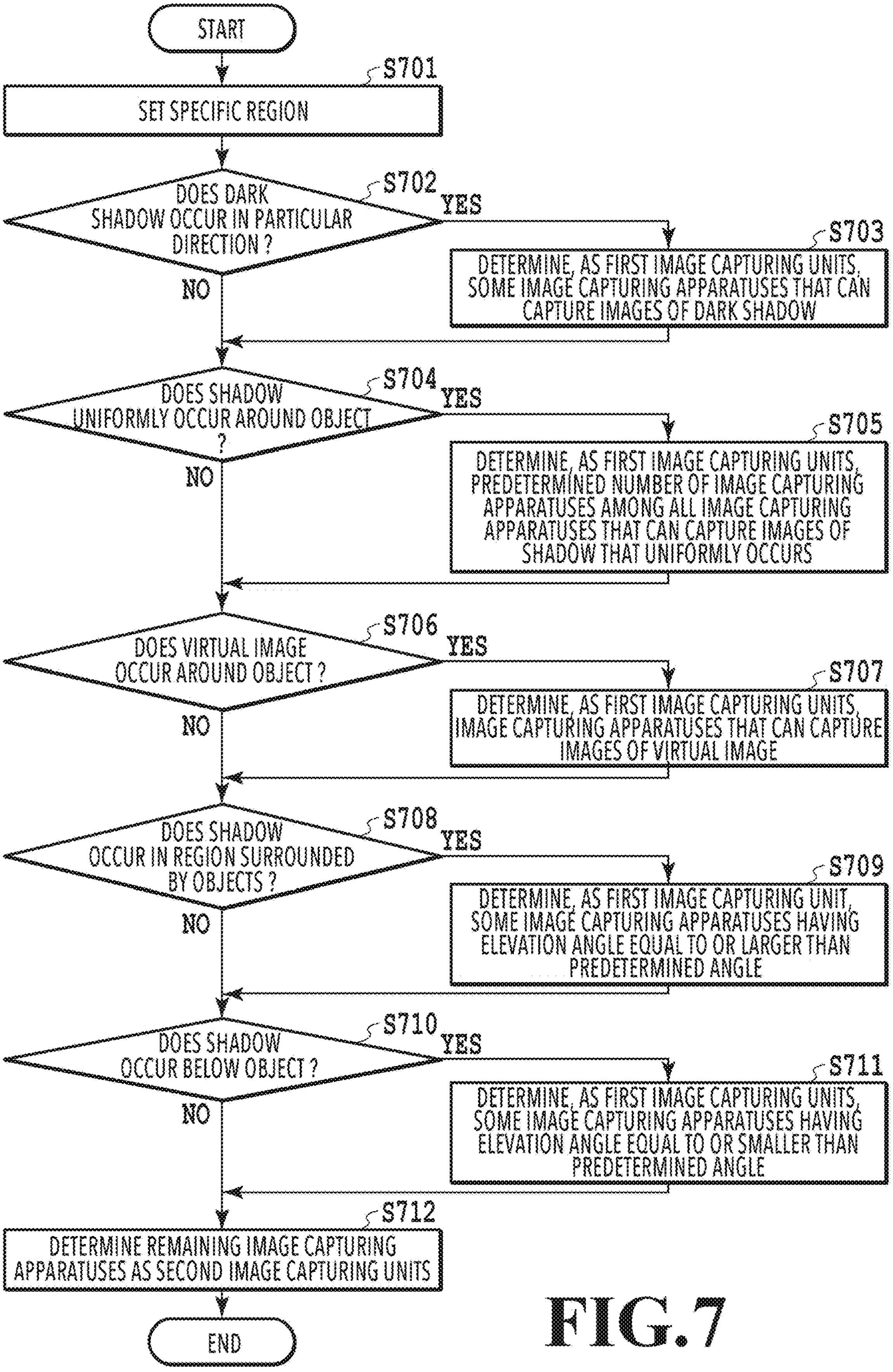
FIG. 7 is a flowchart illustrating an example of the process of deciding the first or second image capturing unit and the first or second image processing unit.

An application example described below is the same as the application example 300 of the image processing system illustrated in FIG. 3 as in Embodiment 1. A method of deciding each image capturing apparatus 302 and the corresponding image capturing apparatus control box 303 as the first image capturing unit 110 and the first image processing unit 120 or as the second image capturing unit 130 and the second image processing unit 140 will be described below with reference to FIGS. 7 and 8A to 8I. FIG. 7 is a flowchart illustrating an example of the process of deciding the first or second image capturing unit 110 or 130 and the first or second image processing unit 120 or 140 according to Embodiment 2.

The decision process illustrated in the flowchart of FIG. 7 is performed based on angles of view decided at installation of the image capturing apparatuses 302 and weather or an illumination condition when the image processing system is used, before processing of the image processing system is started. It is assumed that change of weather or an illumination condition and change of a shadow or a virtual image of an object 306, which potentially occurs in the angle of view of each image capturing apparatus 302 along with the change of weather or an illumination condition are researched in advance. Note that the flowchart of FIG. 7 only decides whether an image capturing apparatus 302 is the first image capturing unit 110 or the second image capturing unit 130. However, in addition, the corresponding image capturing apparatus control box 303 is decided as the first image processing unit 120 or the second image processing unit 140 in accordance with decision of the first image capturing unit 110 or the second image capturing unit 130. Specifically, in a case where an image capturing apparatus 302 is decided as the first image capturing unit 110, the image capturing apparatus control box 303 corresponding to the image capturing apparatus 302 is decided as the first image processing unit 120. In a case where an image capturing apparatus 302 is decided as the second image capturing unit 130, the image capturing apparatus control box 303 corresponding to the image capturing apparatus 302 is decided as the second image processing unit 140.

First at S701, a user sets a specific region. In Embodiment 2, the specific region is a region in which a shadow or a virtual image of an object 306 potentially occurs. Subsequently at S702, the user determines whether a dark shadow occurs in a particular direction. In a case where having determined that a dark shadow occurs in a particular direction at S702, the user decides, as the first image capturing units 110, some of one or more image capturing apparatuses 302 that can capture images of a region in which a dark shadow potentially occurs at S703. Since the image capturing apparatuses 302 capture images of the entire field with overlapping regions in their angles of view, a plurality of image capturing apparatuses 302 have angles of view including a region in which a dark shadow potentially occurs. The user decides one or more of the plurality of image capturing apparatuses 302 as the first image capturing units 110.

Figure 8A:
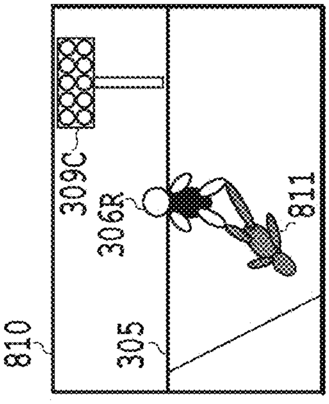
FIGS. 8A to 8I are diagrams for description of an example of shadows and virtual images of an object.
Figure 8B:
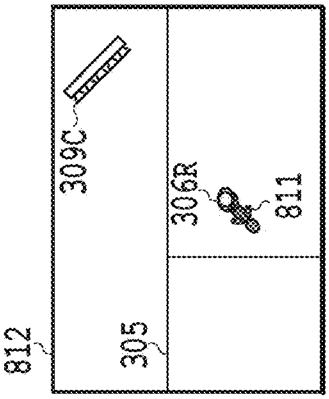

FIGS. 8A to 8F are diagrams for description of an example of shadows and virtual images of objects 306 according to Embodiment 2. FIG. 8A illustrates an example of a shadow 811 that occurs in an angle of view 810 of an image capturing apparatus 302. In the example illustrated in FIG. 8A, the shadow 811 of an object 306R occurs as a dark shadow on the surface of the playing field 305 due to strong light in a specific direction from an illumination apparatus 309C. FIG. 8B illustrates an example of a panoramic image 812 in a case where FIG. 8A is virtually viewed from directly above. In a case where the dark shadow 811 occurs as illustrated in FIG. 8B, the shadow 811 occurs in a particular direction relative to an object 306. Although FIGS. 8A and 8B illustrate an example in which the shadow 811 occurs in one direction, a shadow of the object 306 occurs in two or more directions depending on the number and disposition of illumination apparatuses. However, in a case where a shadow of the object 306 occurs in two or more directions, the shadow is not a dark shadow. This is because the surface of the playing field 305 in a direction in which an illumination apparatus that emits strong light is located in a case where viewed from the object 306 is illuminated with light from the illumination apparatus, and accordingly, a shadow that occurs in a region in the direction is not a dark shadow.

In a case where it is presumed that the dark shadow 811 as illustrated in the panoramic image 812 of FIG. 8B occurs, the user decides, as the first image capturing units 110, some of one or more image capturing apparatuses 302 that exist in a direction in which the dark shadow 811 occurs in a case where viewed from the object 306R. It is only needed to delete voxels corresponding to a region in which the dark shadow 811 occurs, and thus in a case where there is an image capturing apparatus 302 having an angle of view including the entire dark shadow 811, only this image capturing apparatus 302 as the above-described some image capturing apparatuses 302 may be decided as the first image capturing unit 110. In actual image capturing, conditions that voxels corresponding to a region in which a dark shadow potentially occurs can be removed only with one image capturing apparatus 302 are hardly met. In such a case, image capturing apparatuses 302 in a number sufficient for deleting voxels corresponding to a region in which a dark shadow potentially occurs in the entire playing field 305 are decided as the first image capturing units 110.

After S703 or in a case where having determined that no dark shadow occurs in a particular direction at S702, the user determines whether a shadow of the object 306 uniformly occurs around the object 306 at S704. In a case where having determined that a shadow uniformly occurs around the object 306 at S704, the user performs the process at S705. Specifically, at S705, the user decides, as the first image capturing units 110, a predetermined number of image capturing apparatuses 302 among all image capturing apparatuses 302 that can capture images of at least part of a region in which a shadow potentially uniformly occurs around the object 306. This is to reduce unremoved voxels corresponding to a shadow that uniformly occurs around the object 306.

Figure 8C:
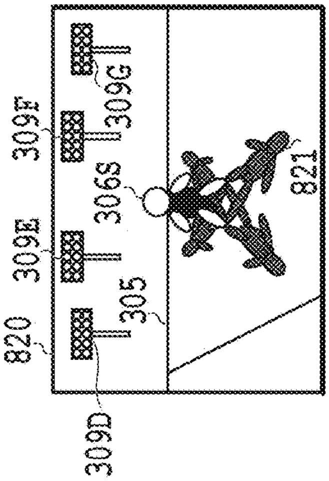
Figure 8D:
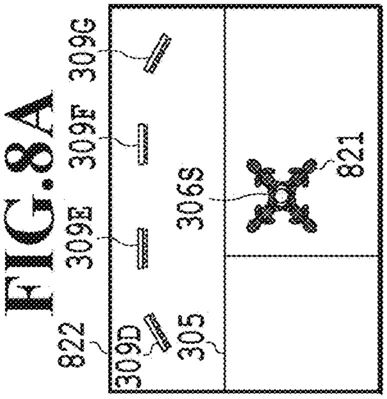

FIG. 8C illustrates an example of a shadow 821 that uniformly occurs around an object 306 in an angle of view 820 of an image capturing apparatus 302. In the example illustrated in FIG. 8C, the shadow 821 occurs around an object 306S due to light emitted from a large number of illumination apparatuses 309 existing around the playing field 305. FIG. 8D illustrates an example of a panoramic image 822 in a case where FIG. 8C is virtually viewed from directly above. As illustrated in FIG. 8D, in a case where the shadow 821 potentially uniformly occurs around the object 306, the user decides, as the first image capturing units 110, a predetermined number of image capturing apparatuses 302 among all image capturing apparatuses 302 having an angle of view including at least part of a region in which the shadow 821 potentially occurs.

The predetermined number is decided based on, for example, an angle difference with which the optical axis of each image capturing apparatus 302 is set relative to an object 306 or an image capturing target space. The user decides a combination of the predetermined number of image capturing apparatuses 302 with which voxels corresponding to the region of the shadow 821 that occurs around the object 306S can be removed, and decides the image capturing apparatuses 302 included in the decided combination as the first image capturing units 110. Specifically, for example, the user decides, as the first image capturing units 110, two or three image capturing apparatuses 302 selected such that the angle difference between the optical axes of the image capturing apparatuses 302 is 120 to 180° from among a plurality of image capturing apparatuses 302 that capture images of part of an image capturing target space. With the two or three image capturing apparatuses 302 selected in this manner, it is possible to capture images of the shadow 821 without shielding by the object 306S.

After S705 or in a case where having determined that no shadow uniformly occurs around the object 306 at S704, the user determines whether a virtual image occurs around the object 306 at S706. In a case where having determined that a virtual image occurs around the object 306 at S706, the user decides, as the first image capturing units 110, some of one or more image capturing apparatuses 302 that can capture images of a region in which a virtual image occurs at S707.

Figure 8E:
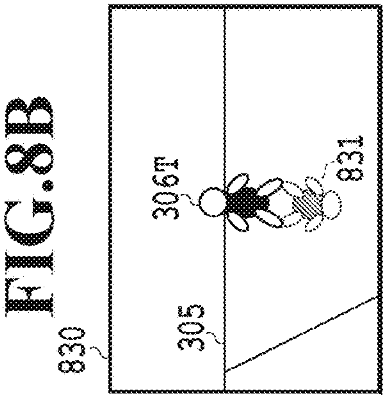
Figure 8F:
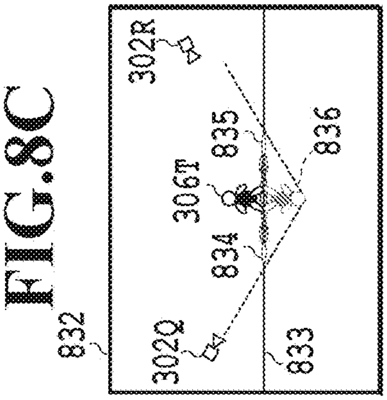

FIG. 8E illustrates an example of a virtual image 831 of an object 306, which occurs in an angle of view 830 of an image capturing apparatus 302. In the example illustrated in FIG. 8E, an image of an object 306T is reflected on the surface of the playing field 305, and accordingly, the virtual image 831 occurs. FIG. 8F is a sectional image 832 in a case where FIG. 8E is virtually viewed from side. A virtual image of the object 306 occurs on a straight line where a plane decided by a straight line connecting the image capturing apparatus 302 and the object 306 and a vector orthogonal to the surface of the playing field 305 intersects the surface of the playing field 305. Thus, a place where a virtual image occurs is different for each image capturing apparatus 302. For example, in the sectional image 832, a virtual image that occurs in a case where an image of the object 306T is reflected on a field surface 833 appears as a virtual image 834 for an image capturing apparatus 302Q and appears as a virtual image 835 for an image capturing apparatus 302R. Thus, fake three-dimensional shape data due to a virtual image does not occur in a region corresponding to a region above the field surface 833 in a three-dimensional shape data generation target space.

However, in a case where a three-dimensional shape data generation target space is set up to a region corresponding to a region below the field surface 833, fake three-dimensional shape data due to a virtual image occurs in a space as described below in the three-dimensional shape data generation target space. Specifically, in this case, fake three-dimensional shape data due to a virtual image occurs in a space corresponding to a region that is plane-symmetric to a region in which an object 306 exists with respect to the field surface 833 in the three-dimensional shape data generation target space. For example, in the sectional image 832, three-dimensional shape data 836 occurs as fake three-dimensional shape data due to a virtual image. Thus, the user decides, as the first image capturing units 110, image capturing apparatuses 302 in a number sufficient for removing voxels of fake three-dimensional shape data that occurs in a space corresponding to a region below the field surface 833.

A virtual image of an object 306 is not shielded by the object 306 unlike a shadow of the object 306. Thus, basically, the user only needs to decide, as the first image capturing unit 110 of an image capturing apparatus 302, optional one of a plurality of image capturing apparatuses 302 that capture images of a region in which a virtual image potentially occurs. However, a plurality of objects 306 are densely located and a virtual image of an object 306 is hidden by another object 306 in some cases. With such a case taken into account, the user may decide, as the first image capturing units 110, two or more image capturing apparatuses 302 among a plurality of image capturing apparatuses 302 that capture images of a region in which a virtual image potentially occurs.

After S707 or in a case where having determined that no virtual image occurs around the object 306 at S706, the user determines whether a shadow occurs in a region surrounded by a plurality of objects 306 at S708. in a case where having determined that a shadow occurs at S708, the user decides, as the first image capturing units 110, some of one or more image capturing apparatuses 302 having an optical axis with an elevation angle equal to or larger than a predetermined angle at S709. in a case where image capturing apparatuses 302 having an optical axis with an elevation angle equal to or larger than the predetermined angle are decided as the first image capturing units 110, it is possible to reduce unremoved three-dimensional shape data due to a shadow that occurs in a region surrounded by a plurality of objects 306.

Figure 8G:
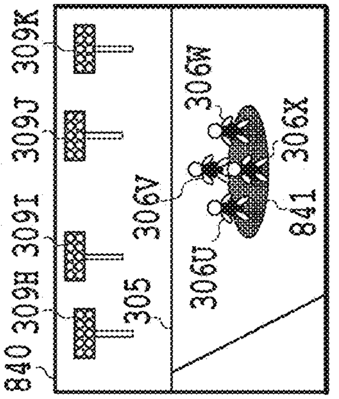
Figure 8H:
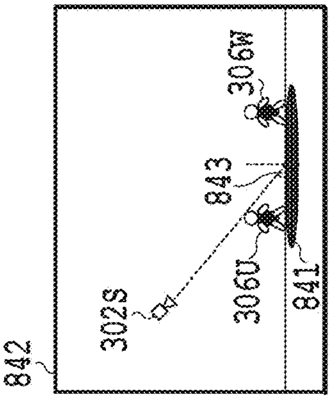

FIG. 8G illustrates an example of a shadow 841 that occurs in a region surrounded by objects 306 in an angle of view 840 of an image capturing apparatus 302. In the example illustrated in FIG. 8G, the shadow 841 occurs in a region surrounded by objects 306U, 306V, 306W, and 306X due to light emitted from a large number of illumination apparatuses 309 existing around the playing field 305. FIG. 8H illustrates an example of a sectional image 842 in a case where FIG. 8G is virtually viewed from side. Voxels corresponding to a region in which the shadow 841 as illustrated in FIGS. 8G and 8H exists can be removed, for example, by using a silhouette image corresponding to a captured image of an image capturing apparatus 302 as described below. The image capturing apparatus 302 is, for example, an image capturing apparatus 302 having an optical axis with an elevation angle larger than an elevation angle 843 of a tangent line extending above the object 306U from the field surface at a central part of a plurality of objects 306 densely located as illustrated in the sectional image 842.

For example, the user sets such an elevation angle as an angle threshold value based on an object 306 as an image capturing target, characteristics of a sport, or the like and decides, as the first image capturing units 110, some of one or more image capturing apparatuses 302 having an optical axis with an elevation angle equal to or larger than the angle threshold value. Specifically, as in the case of the shadow 821 or the virtual image 831, the user selects two or three image capturing apparatuses 302 for which the angle difference between the optical axes of the image capturing apparatuses 302 is 120° to 180° from among a plurality of image capturing apparatuses 302 that satisfy the above-described condition for capturing images of part of an image capturing target space. Further, the user decides the two or three selected image capturing apparatuses 302 as the first image capturing units 110.

After S709, in a case where having determined that no shadow occurs at S708, the user determines whether a shadow occurs below an object 306 at S710. In a case where having determined that a shadow occurs below the object 306 at S710, the user decides, as the first image capturing units 110, some of one or more image capturing apparatuses 302 having an elevation angle equal to or smaller than a predetermined angle at S711. In a case where some of one or more image capturing apparatuses 302 having an elevation angle equal to or smaller than the predetermined angle are decided as the first image capturing units 110, it is possible to reduce unremoved three-dimensional shape data due to a shadow that occurs below the object 306.

Figure 8I:
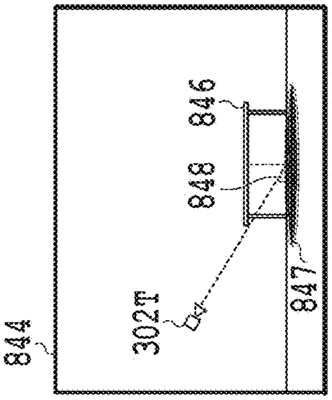

FIG. 8I illustrates an example of a shadow 847 that occurs below an object 846. Note that FIG. 8I illustrates a sectional image 844 in a case where the object 846 is viewed in a horizontal direction. The following description is made with the shadow 847 that occurs due to not an object 306 used in description so far but the object 846 such as a table. Voxels corresponding to a region in which the shadow 847 occurs below the object 846 such as a table can be removed by using a silhouette image corresponding to a captured image of an image capturing apparatus 302 as described below. The image capturing apparatus 302 is, for example, an image capturing apparatus 302 having an optical axis with an elevation angle smaller than an elevation angle 848 of a tangent line extending from the field surface at a central part of the object 846 to an end part of the upper surface of the object 846 as illustrated in the sectional image 844.

For example, the user sets such an elevation angle as an angle threshold value based on the shape or the like of the object 846 as an image capturing target and decides, as the first image capturing units 110, some of one or more image capturing apparatuses 302 having an optical axis with an elevation angle equal to or smaller than the angle threshold value. As in the cases of the shadow 821, the virtual image 831, and the shadow 841, the user selects two or three image capturing apparatuses 302 for which the angle difference between the optical axes of the image capturing apparatuses 302 is 120° to 180° from among a plurality of image capturing apparatuses 302 that satisfy the above-described condition for capturing images of part of an image capturing target space. Further, the user decides the two or three selected image capturing apparatuses 302 as the first image capturing units 110.

After S711 or in a case where having determined that no shadow occurs below the object 306 at S710, the user decides the remaining image capturing apparatuses 302 as the second image capturing units 130 at S712. Specifically, the user decides, as the second image capturing units 130, all image capturing apparatuses 302 not decided as the first image capturing units 110 in the process so far.

As described above, in the background difference method, the image processing system 100 is configured such that a region in which false detection of an object region potentially occurs is set as a specific region. The specific region according to Embodiment 2 is a region in which a shadow or a virtual image of an object 306 potentially occurs. The image processing system 100 is also configured such that data of captured images output from at least some of one or more image capturing apparatuses 302 having an angle of view including the specific region is input to an image processing apparatus that performs object region separation with the learned model 123. The image processing system 100 is further configured such that data of a captured image output from an image capturing apparatus 302 having an angle of view including no specific region is input to an image processing apparatus that performs object region separation by the background difference method. According to the image processing system 100 configured as described above, it is not needed to be able to perform separation processing by both the background difference method and a machine learning method at one image processing apparatus, and it is possible to generate silhouette images with which highly accurate three-dimensional shape data can be generated.

Other Embodiments

In Embodiments 1 and 2, a case where the image processing system 100 is applied to soccer is described above as an example, but application targets of the image processing system 100 are not limited to thereto. FIG. 9 illustrates an application example of the image processing system 100 to another image capturing target. FIG. 9 lists, for each image capturing target, exemplary causes of non-detection or false detection of an object in object region separation processing by the background difference method. A region including these causes is set as a specific region by the same setting method as in Embodiments 1 and 2. Then, each image capturing apparatus 302 is decided as the first image capturing unit 110 or the second image capturing unit 130 based on the specific region and the angle of view of the image capturing apparatus 302. Accordingly, it is possible to generate silhouette images with which highly accurate three-dimensional shape data without missing nor unremoved parts for the shape of an object 306 can be generated.

In Embodiment 1, a case where there is a cause for non-detection of an object in object region separation processing by the background difference method is described above as an example. In Embodiment 2, a case where there is a cause for false detection of an object in object region separation processing by the background difference method is described above as an example. Although an example of a case where there is a cause for non-detection or false detection of an object is separately described in each embodiment, the image processing system 100 is also applicable to a case where these causes coexist. In this case, first, image capturing apparatuses 302 for which a cause for non-detection exists are decided as the first image capturing units 110 by the decision method described in Embodiment 1. Subsequently, by the decision method described in Embodiment 2, some image capturing apparatuses 302 for which a cause for false detection exists among the remaining image capturing apparatuses 302 are decided as the first image capturing units 110, and further, the remaining image capturing apparatuses 302 are decided as the second image capturing units 130. In a case where first image capturing units 110 and second image capturing units 130 are decided in this manner, it is possible to generate silhouette images with which highly accurate three-dimensional shape data without missing nor unremoved parts for the shape of an object 306 can be generated.

Some embodiment(s) of the present disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, it is possible to reduce implementation cost of image processing apparatuses and generate silhouette images with which highly accurate three-dimensional shape data can be generated.

While the present disclosure has described exemplary embodiments, it is to be understood that some embodiments of the disclosure are not limited to the disclosed exemplary embodiments. The scope of the following claims is to be accorded the broadest interpretation so as to encompass all such modifications and equivalent structures and functions.

This application claims priority to Japanese Patent Application No. 2023-107741, which was filed on Jun. 30, 2023, and which is hereby incorporated by reference wherein in its entirety.

What is claimed is:

1. An image processing system comprising:

a first image processing apparatus configured to generate data of a first silhouette image illustrating a region in which an object exists in a first input image by inputting data of the first input image to a learned model, the data of the first input image being data of an image obtained through image capturing of the object by a first image capturing device configured to capture an image of a region including at least part of a specific region, wherein the first image processing apparatus is not configured to calculate a difference between an input image and a background image for generating the first silhouette image; and a second image processing apparatus configured to generate data of a second silhouette image illustrating a region in which the object exists in a second input image by calculating a difference between the second input image and a background image that is an image obtained through image capturing by a second image capturing device different from the first image capturing device in a state in which the object does not exist in a region subjected to image capturing by the second image capturing device, as data of the second input image being data of an image obtained through image capturing of the object by the second image capturing device, wherein the second image processing apparatus is not configured to use a learned model for generating the second silhouette image.

2. The image processing system according to claim 1, wherein the second image capturing device captures an image of a region not including the specific region.

3. The image processing system according to claim 1, wherein the specific region is a region in which the object potentially exists substantially at rest.

4. The image processing system according to claim 1, wherein the specific region is a region in which a difference between color of the object and background color of a region subjected to image capturing by the first image capturing device or the second image capturing device is smaller than a predetermined reference.

5. The image processing system according to claim 1, wherein the specific region is a region in which a shadow of the object or a virtual image due to image reflection of the object in part of a region subjected to image capturing by the first image capturing device or the second image capturing device potentially occurs.

6. The image processing system according to claim 1, wherein some of one or more image capturing devices each including at least part of the specific region in an angle of view are each set as the first image capturing device.

7. The image processing system according to claim 1, wherein image capturing devices an angle between optical axis vectors of which is equal to or larger than a predetermined angle among two or more image capturing devices each including at least part of the specific region in an angle of view are set as the first image capturing devices.

8. The image processing system according to claim 1, wherein among one or more image capturing devices each including at least part of the specific region in an angle of view, an image capturing device an angle between an optical axis vector of which and a field surface of an image capturing target of the image capturing device is equal to or larger than or equal to or smaller than a predetermined angle is set as the first image capturing device.

9. The image processing system according to claim 1, wherein the first image processing apparatus comprising:

one or more processors; and one or more memories storing one or more programs configured to be executed by the one or more processors, the one or more programs including instructions for obtaining, as the data of the first input image, data of an image obtained through image capturing of the object by the first image capturing device;

generating the data of the first silhouette image by inputting the obtained data of the first input image to the learned model; and outputting the generated first silhouette image, and the second image processing apparatus comprising:

one or more processors; and one or more memories storing one or more programs configured to be executed by the one or more processors, the one or more programs including instructions for obtaining, as the data of the second input image, data of an image obtained through image capturing of the object by the second image capturing device;

generating the data of the second silhouette image by calculating a difference between the obtained second input image and the background image; and outputting the generated second silhouette image.

10. The image processing system according to claim 1, further comprising a third image processing apparatus configured to generate three-dimensional shape data indicating a shape of the object by using the data of the first silhouette image generated by the first image processing apparatus and the data of the second silhouette image generated by the second image processing apparatus.

11. The image processing system according to claim 10, wherein the third image processing apparatus comprising:

one or more processors; and one or more memories storing one or more programs configured to be executed by the one or more processors, the one or more programs including instructions for obtaining the data of the first silhouette image output from the first image processing apparatus and the data of the second silhouette image output from the second image processing apparatus, and generating the three-dimensional shape data by using the obtained data of the first silhouette image and the obtained data of the second silhouette image.

12. An image processing method comprising:

a first image processing process executed by a first image processing apparatus, the first image processing process including a first obtaining process of obtaining, as data of a first input image, data of an image obtained through image capturing of an object by a first image capturing device configured to capture an image of a region including at least part of a specific region, a first process of generating data of a first silhouette image illustrating a region in which the object exists in the first input image by inputting the data of the first input image into a learned model, and a first outputting process of outputting the data of the first silhouette image, wherein the first image processing apparatus is not configured to calculate a difference between an input image and a background image for generating the first silhouette image; and a second image processing process executed by a second image processing apparatus, the second image processing process including a second obtaining process of obtaining, as data of a second input image, data of an image obtained through image capturing of the object by a second image capturing device different from the first image capturing device, a second generating process of generating data of a second silhouette image illustrating a region in which the object exists in a second input image by calculating a difference between the second input image and a background image that is an image obtained through image capturing by a second image capturing device in a state in which the object does not exist in a region subjected to image capturing by the second image capturing device, and a second outputting process of outputting the data of the second silhouette image, wherein the second image processing apparatus is not configured to use a learned model for generating the second silhouette image.

* * * * *